(No Model.)

J. A. WELLS.
NUT LOCK.

No. 524,034. Patented Aug. 7, 1894.

WITNESSES:
Fred G. Dieterich
Edw. W. Byrn

INVENTOR
Jesse A. Wells.
BY Munn & Co
ATTORNEYS.

UNITED STATES PATENT OFFICE.

JESSE A. WELLS, OF GUYANDOTTE, WEST VIRGINIA.

NUT-LOCK.

SPECIFICATION forming part of Letters Patent No. 524,034, dated August 7, 1894.

Application filed December 11, 1893. Serial No, 493,342. (No model.)

*To all whom it may concern:*

Be it known that I, JESSE A. WELLS, of Guyandotte, in the county of Cabell and State of West Virginia, have invented a new and useful Improvement in Nut-Locks, of which the following is a specification.

The object of my invention is to provide a simple and efficient nut lock to prevent the loosening and dislodging of nuts on screw bolts, and especially such bolts as are used upon rail way cars, track rails, bridges, and other machinery or vehicles which are subject to jar or vibration.

It consists in a simple, cheap, and practical device for locking the nut to place so that it cannot come off, and also for subsequently tightening the same from time to time in case it wears loose.

Figure 1:
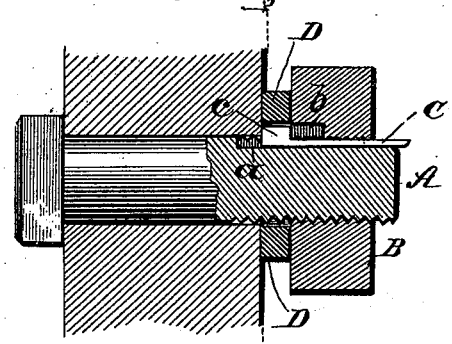
Figure 2:
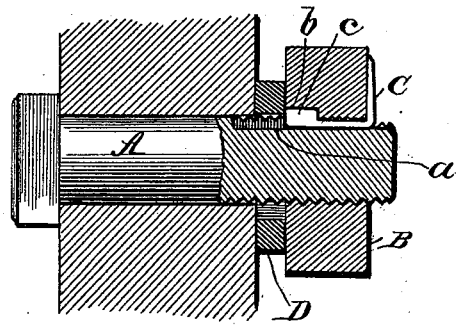
Figure 3:
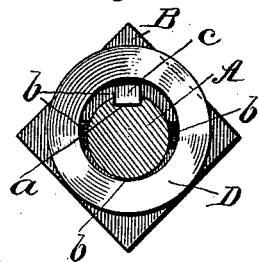
Figure 4:
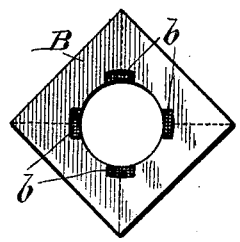

Figure 1 is a longitudinal section through the bolt and nut showing the nut in process of being turned up. Fig. 2 is a similar view with the nut turned up to place and the locking key adjusted to its locking position. Fig. 3 is a transverse section through the line 3—3 of Fig. 1, and Fig. 4 is an inside face view of the nut.

In the drawings A represents the bolt whose end is screw threaded in the usual way. Across the threads of this bolt is formed a longitudinal channel or groove $a$.

B is the nut which is screw threaded interiorly to fit the screw threaded end of the bolt and has formed in its inner face a number of recesses $b$.

C is the locking key. The body of this key is made of a size to fit within the groove or channel in the bolt and lie below the threads, while its head $c$ is made thicker so as to project about a sixteenth of an inch above the threads and is designed to enter one of the recesses of the nut and lock it so it cannot turn.

D is a washer which lies behind the nut and between it and the bearing surface against which the nut is to press. This washer is made of any internal diameter somewhat greater than the diameter of the bolt, and the added thickness of the key head, and is made of a thickness equal to or greater than the length of the key head so that the key head may lie wholly within the plane of the washer and be housed by the same.

To adjust this nut lock, the washer is placed upon the bolt, the key inserted in the groove with its head inward, and the nut is then turned up to a bearing against the washer as shown in Fig. 1, the head of the key still lying within the plane of the washer and outside of the plane of the recesses in the nut. The key is now pulled outwardly until its head enters one of the recesses to lock the nut, and then the outer end of the key is bent up over the nut, as shown in Fig. 2, (or around the bolt) which causes the key to be permanently held in this position in which it locks the nut. To enable the operator to know when one of the recesses in the nut registers with the key so that the latter can be pulled out to the locking position, these recesses are formed in radial alignment with the corners of the nut, or on a line bisecting the angles of the nut, and for this purpose the nut need not be square, but it may be hexagonal or octagonal.

The washer D forms an important part of this nut lock, for by being of a diameter large enough to inclose the head of the key and the bolt too, it gives a housing for the head of the key while the nut is being turned up, as in Fig. 1, and then when the nut is turned far enough, this washer is forced or permitted to drop down, as in Fig. 2, when the top part of the washer lies behind the head of the key and acts as an abutment thereto to hold the head of the key in the recess $b$ of the nut so as to lock the same. When this washer is adjusted to this lower position its center of gravity is lowered, and it hangs suspended on the bolt in such a position that it can never turn away from or get from behind the head of the key until lifted, so that even if the nut and washer should, from shrinking or wear, become loose, this pendent washer will always continue to hang behind the head of the key and prevent the nut from becoming unlocked. As the opening in the washer is a large one it requires no nice adjustment of the washer to tell when the head of the key may pass into said washer.

If it is desired to tighten the nut at any time, the key is straightened out, the washer lifted up and the head of the key forced back again into the plane of the washer. The nut may now be turned up another notch or so, the key then pulled out to seat its head in this further notch, and the washer then dropped again behind the head, and the outer end of the key then bent up.

This nut lock is easily and quickly applied; is positive and certain in its action; may be tightened when necessary; and may also be removed and used again as often as desired without breakage or sacrifice of any of the parts.

Having thus described my invention, what I claim as new, and desire to secure by Letters Patent, is—

A nut lock comprising a screw threaded bolt with a longitudinal channel, a nut having recesses on its inner face, a key lying in the said channel and having a head adapted to enter one of said recesses, and a washer having an internal diameter equal to the combined thickness of the bolt and the head of the key, and a thickness equal to the length of the head; the said washer being adapted to move bodily at right angles to the bolt and hang suspended behind the head of the key substantially as and for the purpose described.

JESSE A. WELLS.

Witnesses:
  D. J. JENKINS,
  THOS. A. WIATT.